T. N. RUSSELL.
CAR COUPLING CENTERING DEVICE.
APPLICATION FILED MAR. 19, 1915.

1,150,457.

Patented Aug. 17, 1915.
3 SHEETS—SHEET 1.

WITNESS.
L. B. Graham

INVENTOR:
Thomas N. Russell
By Adams & Jackson
Att'ys.

T. N. RUSSELL.
CAR COUPLING CENTERING DEVICE.
APPLICATION FILED MAR. 19, 1915.
1,150,457.
Patented Aug. 17, 1915.
3 SHEETS—SHEET 2.
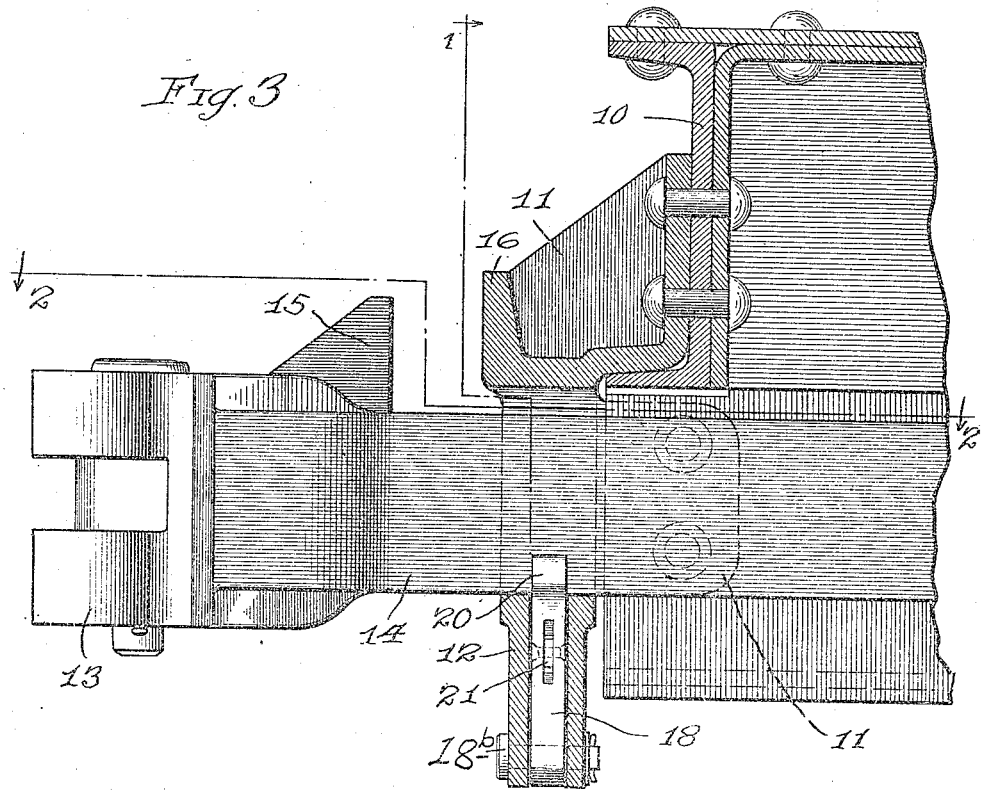
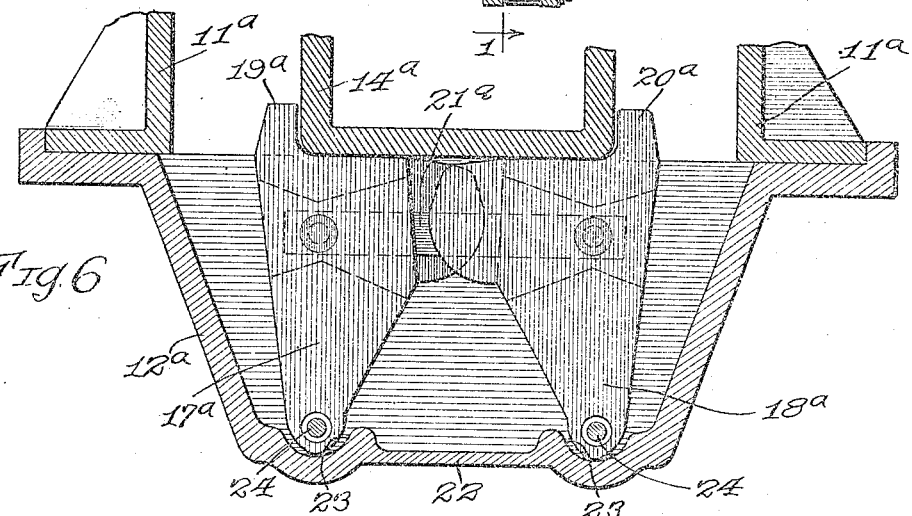
WITNESS.
L. B. Graham
INVENTOR:
Thomas N. Russell
By Adams & Jackson
Attys.

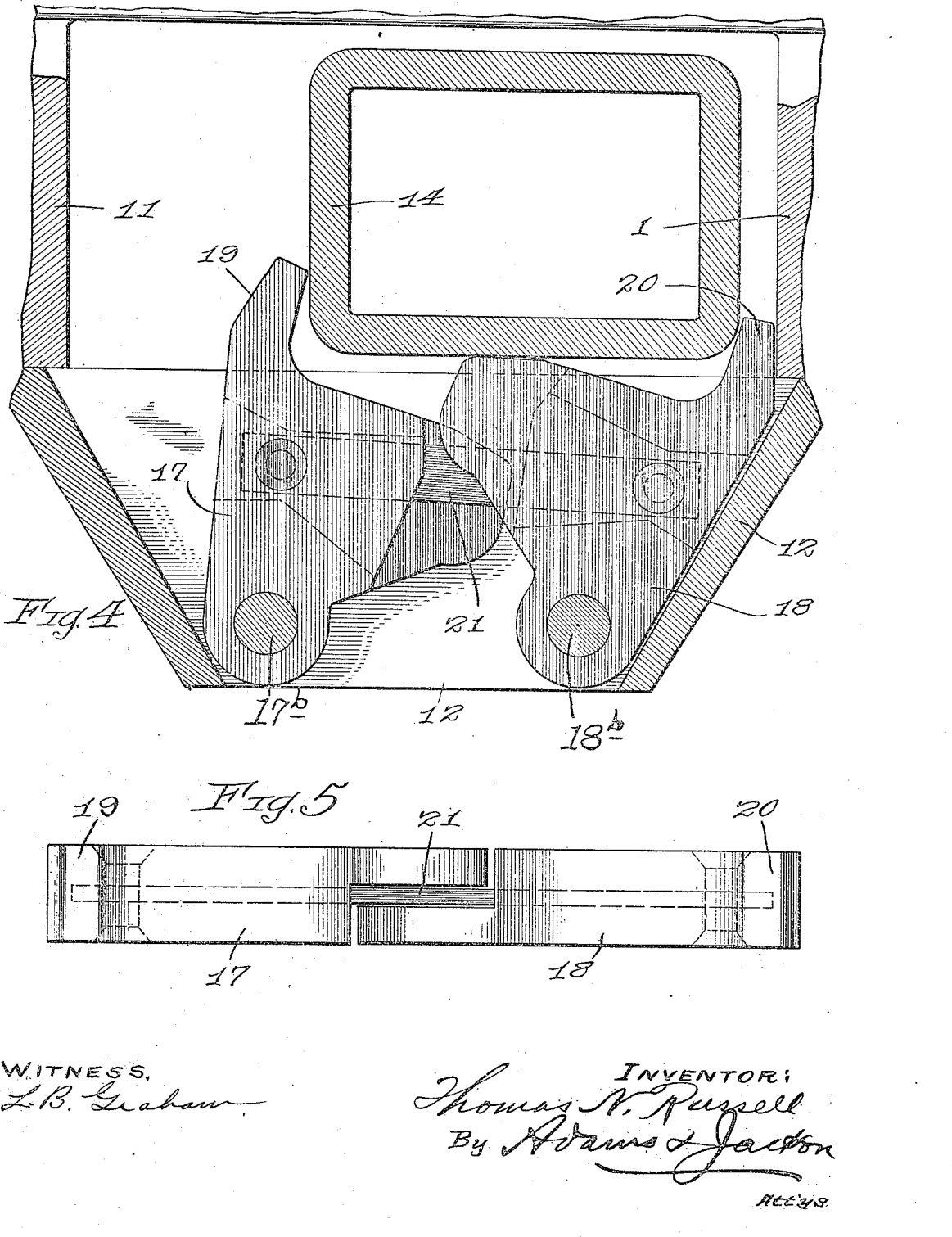

UNITED STATES PATENT OFFICE.

THOMAS N. RUSSELL, OF CHICAGO, ILLINOIS.

CAR-COUPLING-CENTERING DEVICE.

1,150,457.  Specification of Letters Patent.  Patented Aug. 17, 1915.

Application filed March 19, 1915. Serial No. 15,473.

*To all whom it may concern:*

Be it known that I, THOMAS N. RUSSELL, a citizen of the United States, and a resident of Chicago, in the county of Cook and State of Illinois, have invented certain new and useful Improvements in Car-Coupler-Centering Devices, of which the following is a specification, reference being had to the accompanying drawings.

This invention relates to means for centering a car-coupler laterally relative to the car-body.

When a car is uncoupled from the adjacent car while standing upon a curved track, the coupler is left out of its normal centered position unless some means be provided by the action of which the coupler, when released from the coupler of the adjacent car, is moved into its normal centered position relative to the car-body. When a car not provided with a coupler-centering-device, and having its coupler displaced from its normal centered position toward one side of the car, is to be coupled to another car having its coupler in normal position or out of normal position toward the opposite side of the car, it is necessary for the brakeman to force one or both of the couplers laterally so as to cause a proper engagement of the coupling-devices. Inasmuch as a coupler in ordinary use upon a freight-car weighs some three or four hundred pounds, it will be understood that under such circumstances the operation of coupling two cars is accomplished only by the exercise of considerable force on the part of the brakeman, such operation being accomplished very often with some little danger to the brakeman.

It is the principal object of my invention to provide mechanism through the medium of which when a car is uncoupled the coupler automatically moves to its normal centered position relative to the car, whether the car be upon a curved or a straight track, and whether or not the car be precisely in its normal upright position or tipped slightly from such normal position by reason of the inclination of the track.

It is another object of my invention to improve devices of this type in sundry details hereinafter pointed out.

The preferred means by which I have accomplished my objects are illustrated in the accompanying drawings and are hereinafter specifically described.

That which I believe to be new and desire to cover in this application is set forth in the claims.

Figure 1:
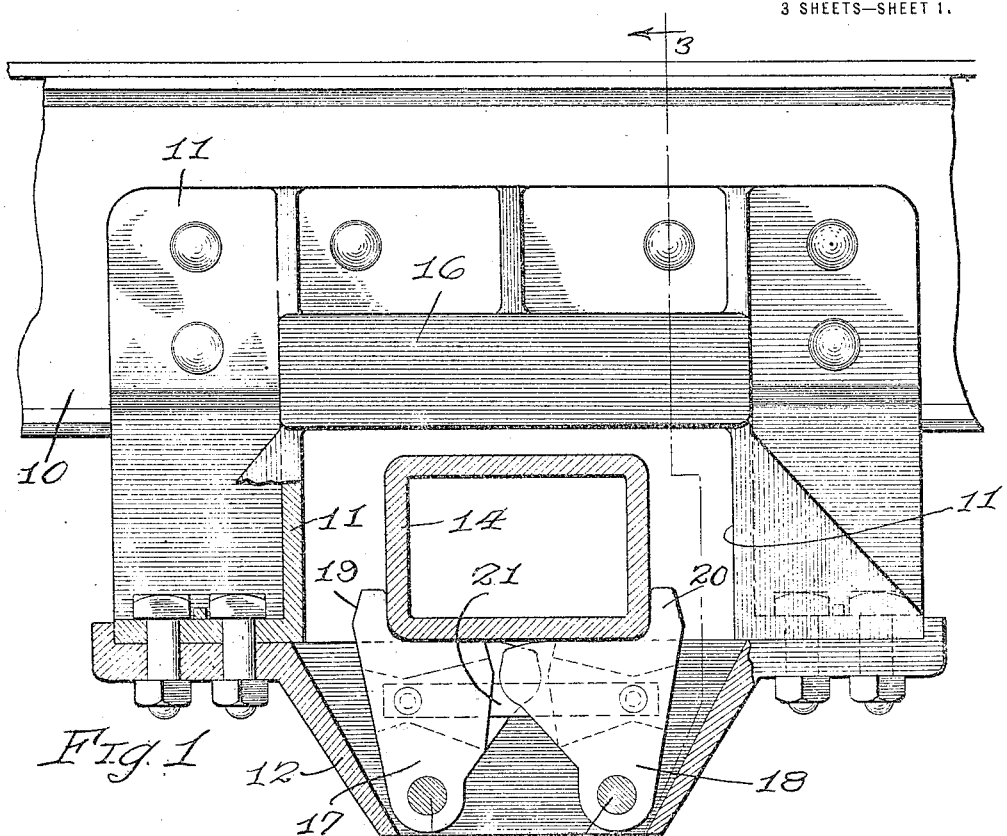
Figure 2:
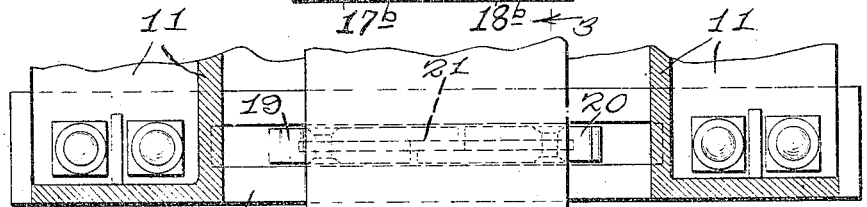

In the drawings, Figure 1 is a transverse vertical section through the shank of a coupler of a car, showing my improved centering-devices, the view being substantially a cross-section taken on line 1—1 of Fig. 3; Fig. 2 is a top view of my improved device, being substantially a horizontal section taken on line 2—2 of Fig. 3; Fig. 3 is a longitudinal vertical section through my improved devices, being taken substantially on line 3—3 of Fig. 1; Fig. 4 is an enlarged detail, similar in part to Fig. 1, but showing the operating parts in a changed position; Fig. 5 is a top plan view of the centering members or cams; and Fig. 6 is an enlarged detail showing a modified form of construction.

Referring to Figs. 1 to 5, in which corresponding parts are indicated by the same reference characters,—10 indicates the end sill of a car, and 11 indicates a striking casting, said end sill and said striking casting being secured by bolts or rivets in suitable position upon the frame-work of a car. As best shown in Fig. 1, the striking casting 11 is formed in the shape of an inverted U, to the lower ends of the arms of which is secured a carrier-iron 12. A coupler comprising a coupling device 13 of any approved type, secured upon the outer end of a coupler-shank 14, is movably mounted between the arms of the striking casting 11, being adapted to move laterally of the car therebetween. The coupler-shank 14 and the striking casting 11 are provided with oppositely-disposed buffers 15—16, which are adapted to limit the inward movement of the coupler longitudinally of the car-body. In the construction shown, the carrier-iron 12 is in the form of a housing having two laterally-disposed vertical walls spaced a short distance apart with two diagonally-disposed walls extending longitudinally of the car, joining the ends of the laterally-disposed walls. Pivotally mounted between the laterally-disposed walls of the carrier-iron 12 are two cams or arms 17—18, the upper ends of which when in their normal centered position extend substantially flush with the upper edge of the carrier-iron 12. The pivots for the cams or arms are indicated by 17$^b$ and 18$^b$, respectively. The members 17—18 are respectively provided with ears or lugs 19—20 which are adapted to lie upon the opposite sides of the coupler-shank 14 so as to cause the arms or cams 17—18 to move laterally with the coupler-shank, as hereinafter described. The arms or cams 17—18 are cored out to provide for the insertion of a link 21 which is pivotally connected to said two arms 17—18, whereby said two arms are caused to swing together. With the parts in the position shown in Fig. 1, the coupler-shank 14 is free to move laterally out of the normal central position shown therein, such lateral movement of the shank causing the arms or cams 17—18 to turn on their pivot-pins in a corresponding direction. Such movement of the coupler-shank and the arms 17—18 causes the coupler-shank to rise slightly relative to the carrier-iron 12, as illustrated in Fig. 4. As will be readily understood, with the parts held by any suitable agency in the position shown in Fig. 4, upon the release of the coupler by such agency the coupler will automatically move to its central position by reason of the weight of the coupler upon one of the arms or cams 17—18. The engaging portion of each of the arms or cams 17—18 upon which the shank 14 rests as it is moved laterally relative to the carrier-iron, is designed to be so located relative to the axis of rotation of the arm that the vertical plane passing through such engaging and supporting portion of the arm passes between the axes of the arms 17—18 regardless of any tipping of the car by reason of any normal inclination of the track upon which the car is standing. By this expedient the shank is insured being returned to its normal centered position relative to the car regardless of any normal tipping of the car body.

In Fig. 6, which shows a slightly modified form of construction, corresponding parts are indicated by the same reference characters but with the addition of an exponent "a." In the construction here illustrated, the housing of the carrier-iron 12ª is provided with a bottom wall 22 provided with grooves or sockets 23 extending longitudinally of the car, in which grooves or sockets the lower ends of the arms or cams 17ª—18ª rest. The arms 17ª—18ª are secured loosely in position in said grooves 23 by means of pins 24 passing loosely through suitable holes in the lower ends of said arms, whereby said arms, as they swing relative to the carrier-iron, are adapted to have a rolling motion in the grooves 23, thus reducing the friction to a minimum. Each of the arms 17—18 has its upper operative engaging corner beveled slightly whereby an extended bearing is provided by the arm for the coupler substantially at the end of the lateral stroke of the arm. The bevel is such, however, that when the arm is in its extreme turned position as shown in Fig. 4, there is a slight clearance except at the extreme corner, whereby the tendency of the coupler to start back to its centered position is materially increased. By reason of this beveling of the arm, the height to which the coupler is raised is lessened, while at the same time the tendency of the coupler to start back to the center from its extreme lateral position is not materially decreased relative to what it would be if the upper end of the arm were extended without the bevel.

That which I claim as my invention, and desire to secure by Letters Patent, is,—

1. The combination of a car-body, a coupler movable laterally relative to said car-body, and two arms pivotally supported below said coupler and adapted to bear upon said coupler at points between the axes of said arms whereby upon a movement of said coupler laterally in either direction from its normal position said coupler is moved upward slightly by its engagement with the arm at that side and is lifted out of engagement with the arm at the other side.

2. The combination of a car-body, a coupler movable laterally relative to said car-body, an arm pivotally supported below said coupler and adapted to bear upon said coupler at one side of the axis of said arm whereby upon a movement of the coupler laterally from its normal position toward the axis of said arm said coupler is moved slightly upward, and means for limiting the lateral swinging of said arm with said coupler, said arm being beveled slightly at its upper operative engaging corner whereby an extended bearing is provided for said coupler by said arm at substantially the end of the lateral stroke of the arm.

3. The combination of a car-body, a coupler movable laterally relative to said car-body, an arm pivotally supported below said coupler and adapted to bear upon said coupler at one side of the axis of said arm whereby upon a movement of the coupler laterally from its normal position toward the axis of said arm said coupler is moved slightly upward, and means for limiting the lateral swinging of said arm with said coupler, said arm being beveled slightly at its upper operative engaging corner whereby the coupler engages the arm at a point removed from its corner except when at its extreme lateral position, at which time the coupler engages the corner of the arm at an increased distance off center relative to the arm.

4. The combination of a car-body, a coupler movable laterally relative to said car-body, two arms pivotally supported below said coupler and adapted to bear upon said coupler at points between the axis of said arms, and means for connecting said two arms to cause them to swing together whereby upon a movement of the coupler laterally in either direction said coupler is caused by its engagement with the arm at that side to move slightly upward.

5. The combination of a car-body, a coupler movable laterally relative to said car-body, two arms pivotally supported below said coupler, means connecting said arms for causing them to swing together, said arms being adapted to engage said coupler at points between their axes of revolution, and means coöperating with said arms for holding said coupler against lateral movement relative to the upper ends of said arms.

6. The combination of a car-body, a coupler movable laterally relative to said car-body, two arms pivotally supported below said coupler, and means connecting said arms for causing them to swing together, said arms being adapted to engage said coupler at points between their axes of revolution, said arms being adapted to engage the lateral faces of the coupler-shank whereby a lateral movement of the coupler causes said arms to swing on their axes.

7. The combination of a car-body, a coupler movable laterally relative to said car-body, two arms pivotally supported below said coupler, and means for connecting said arms to cause them to swing together, said arms being adapted to engage said coupler at points between the axes of revolution of said arms whereby upon a lateral movement of said coupler toward one side said coupler is raised slightly by the engagement of the arm at that side with the coupler, the arrangement being such that upon the release of the coupler when out of normal position the coupler is adapted to return to normal position regardless of any slight tipping of the car-body from the normal.

THOMAS N. RUSSELL.